United States Patent [19]

Rogers

[11] Patent Number: 4,598,995
[45] Date of Patent: Jul. 8, 1986

[54] COMBINED STRIPPING AND CONTACT FRAME WORK STATION

[76] Inventor: James W. Rogers, 8231 Wyngate St., #24, Sunland, Calif. 91040

[21] Appl. No.: 729,546

[22] Filed: May 2, 1985

[51] Int. Cl.⁴ .............................................. G03B 27/20
[52] U.S. Cl. ........................................ 355/91; 355/73
[58] Field of Search ...................... 355/91, 93, 94, 73, 355/76

[56] References Cited

U.S. PATENT DOCUMENTS 4,053,226 10/1977 Michalski et al. .................... 355/91
4,083,301 4/1978 Black ..................................... 355/91

Primary Examiner—Monroe H. Hayes
Attorney, Agent, or Firm—Poms, Smith, Lande & Rose

[57] ABSTRACT

A combined stripping and vacuum contact frame work station includes a work table and an easel for placing work to be viewed from said work table. In addition, a vacuum contact frame for assembling negatives and exposing a film with a composite image thereon, is movable between a position where it forms part of the easel, with the underside of the vacuum contact frame forming the easel surface, and another position where the vacuum contact frame is face up on top of the work table. A high intensity light is provided for applying intense illumination to the low sensitivity "lights-on" film which may be employed. A safe light and conventional interior lighting arrangements may also be provided, and the work table may be an optical light table to provide illumination for use in "stripping" or preparing composite images from film clips. The vacuum contact frame may be moved from the working position on top of the work table to the stored position where it is part of the easel, either with a composite film in place in the frame, and with the vacuum turned on, or empty of film, merely to store the contact frame out of the way.

20 Claims, 7 Drawing Figures

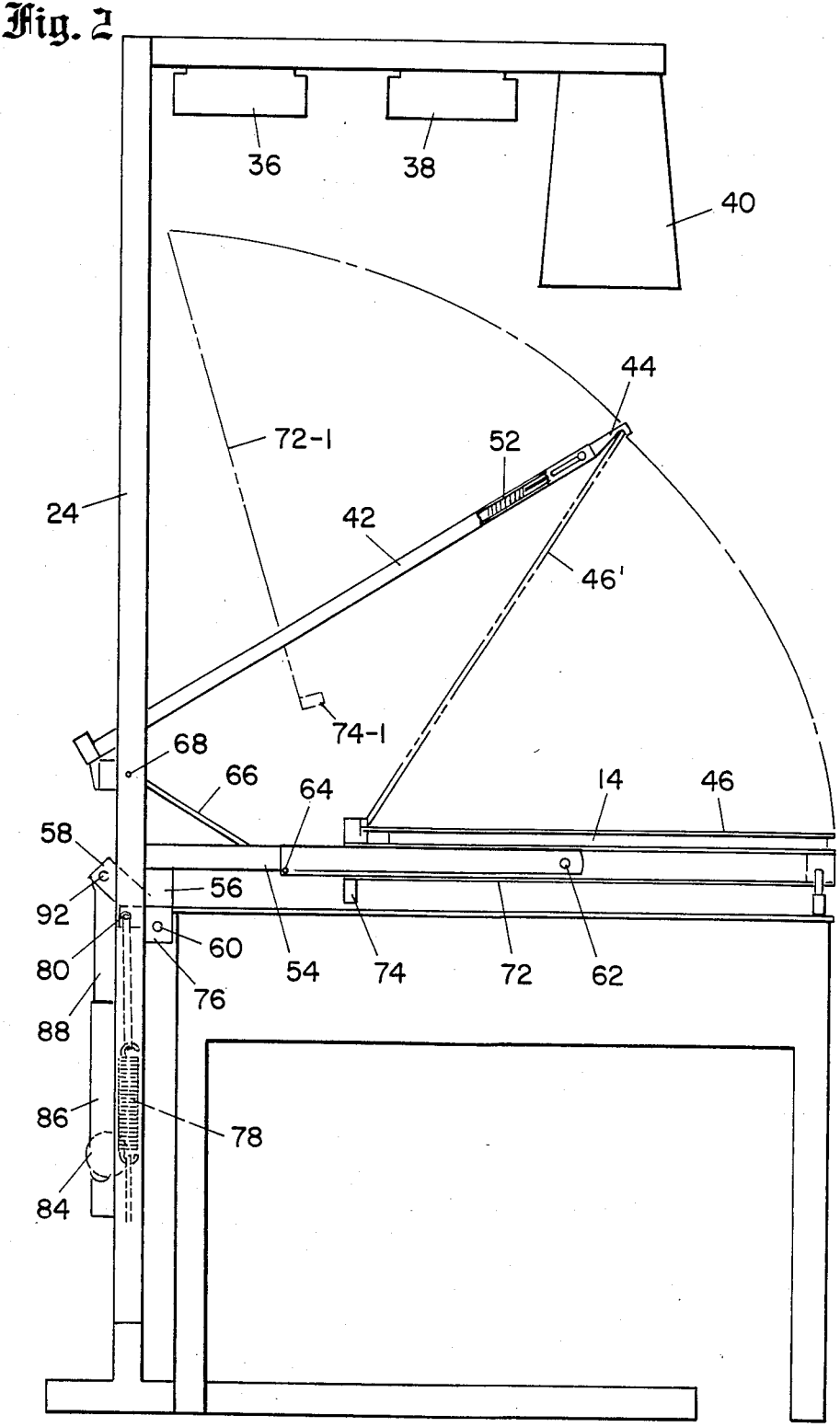

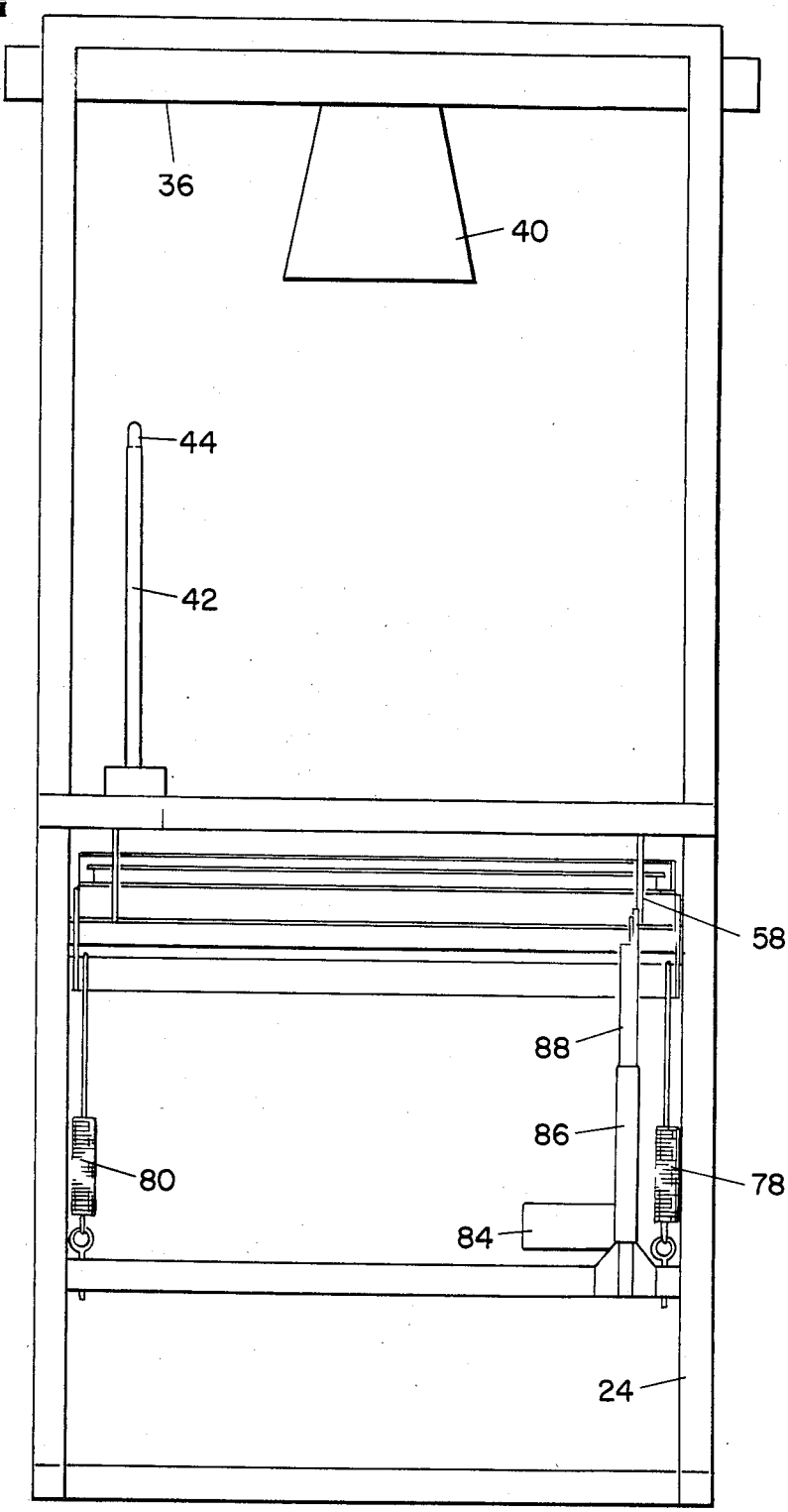

COMBINED STRIPPING AND CONTACT FRAME WORK STATION

FIELD OF THE INVENTION

This invention relates to apparatus which normally includes an optical light table and a separate vacuum contact frame for forming composite photographic images.

BACKGROUND OF THE INVENTION

For many types of commercial art work, it is customary to use a number of photographic negative clips and to assemble these clips on an optical light table, to plan the layout; and then take the film clips to a darkroom where they are mounted in a vacuum contact frame in their proper relative position over a new sheet of film on which the composite image is to appear. A glass plate is then pivoted down over the photographic clips to hold them firmly in place over the unexposed film sheet, and vacuum pressure is supplied within the contact frame to pull the glass plate firmly down on the layers of film to press them tightly together. The film is then exposed and developed.

In the foregoing process as described above, the worker, who is known in the trade as a "stripper", normally does much of his planning work at a work station where he has a light table available and then moves to the dark room to expose the film. This means that he must have two work areas and move back and forth between the two work stations. Alternatively, if the contact frame is used by a number of different "strippers", there may be delays or inconvenience in obtaining access to the contact frame.

Accordingly, an important object of the present invention is to avoid the inconvenience of having to move from one work station to another; and a collateral object is to form a more compact work station where the two functions are combined in a single location, thereby saving time and money.

SUMMARY OF THE INVENTION

In accordance with a specific illustrative embodiment of the present invention, a combined stripping and contact frame work station includes an optical light table, and an easel mounted on one side of the optical light table for use by the person working at the optical light table. In addition, a vacuum contact frame is provided, with arrangements for mounting it in two separate positions, with the first position being with the vacuum contact frame mounted right side up on top of the work table surface, and the second being with the vacuum contact frame being raised upwardly to form part of the easel, with the back of the contact frame being provided with a strip forming a continuation of the lower holding strip running along the bottom of the easel.

Other features of the preferred illustrative embodiment of the invention include one or more of the following additional points:

1. A high intensity lamp may be mounted above the work table, for use with "lights-on" film having a relatively low exposure index, so that the entire process may be accomplished under normal indoor ambient light conditions.

2. The work station may also be provided with a "safe" light, and a normal indoor lighting fixture, for use during the time periods when the film is exposed, and during intervals when the contact frame is not in use, respectively.

3. A hook mounted on a vacuum-operated piston is provided for selectively engaging the glass plate of the vacuum contact frame as it is shifted into position onto the work table surface, with the hook being operative to separate and pivot the glass plate away from the remainder of the vacuum contact frame when there is no vacuum applied to the frame, and to permit the vacuum contact frame to swing down as a unit, when there is vacuum being applied to the frame, with the film still inside.

4. A light integrator may be mounted adjacent the contact frame to accurately determine the amount of incident illumination which has been received.

5. The base for supporting the easel and the movable vacuum contact frame may extend under the optical light table, with storage space included in the base to permit the storage of film, paper, and other necessities for the strippers job.

In accordance with another, broad aspect of the invention, a work table is provided in combination with a composite image forming frame, and the frame is selectively moved between a first position where it is resting on top of the work surface, and a second position where it is shifted away from the work table so that the worker may perform other tasks directly on the work table surface.

The new arrangement in which the stripping and contact frame work stations are combined have many different advantages, including the following:

1. The proposed new arrangements save much valuable floor space, using only about 7 inches of floor space beyond that occupied by the normal light table. With these new arrangements, the existing contact frame darkrooms may be reduced in size or eliminated and replaced with additional stripping stations, thereby providing much greater profits with the same square footage of floor space.

2. Each "stripper" would have an individual contact frame and vacuum system. Using a 24 inch×30 inch film size capability, the stripper would normally be able to handle 90 percent or more of the work which a stripper normally performs. This would mean that there would be virtually no more waiting or congestion in the contact room, because each stripper would normally stay in his own work area. Register problems could be substantially eliminated by the use of one contact frame and one pin system. In addition, temperature change problems in going from one room to another would be eliminated.

3. The provision of a large easel which may be in the order of 7 feet across houses the contact frame while it is not in use and provides a convenient storage space for stripping supplies. In addition, with the large easel, the artwork remains in front of the stripper at all times for quick easy reference while stripping and contacting.

4. The light integrator which is provided serves to give consistent results despite changes in line voltage or deterioration of the high intensity exposure lamp.

5. The provision of a large film cabinet under the light table in the base of the easel and light frame support gives the entire assembly stability, and permits each stripper to know where the film of the proper size is located, so that he may continue his work without breaking concentration.

Other objects, features and advantages of the invention will become apparent from a consideration of the following detailed description, and from the accompanying drawings.

BRIEF DESCRIPTION OF THE DRAWINGS

FIG. 2 is a side view illustrating the mechanical features of the present invention, and particularly the movement of the vacuum contact frame;

FIG. 3 is a rear view showing the counter-balancing arrangements for the vacuum contact frame, and other mechanical features of the apparatus;

DETAILED DESCRIPTION

Figure 1:
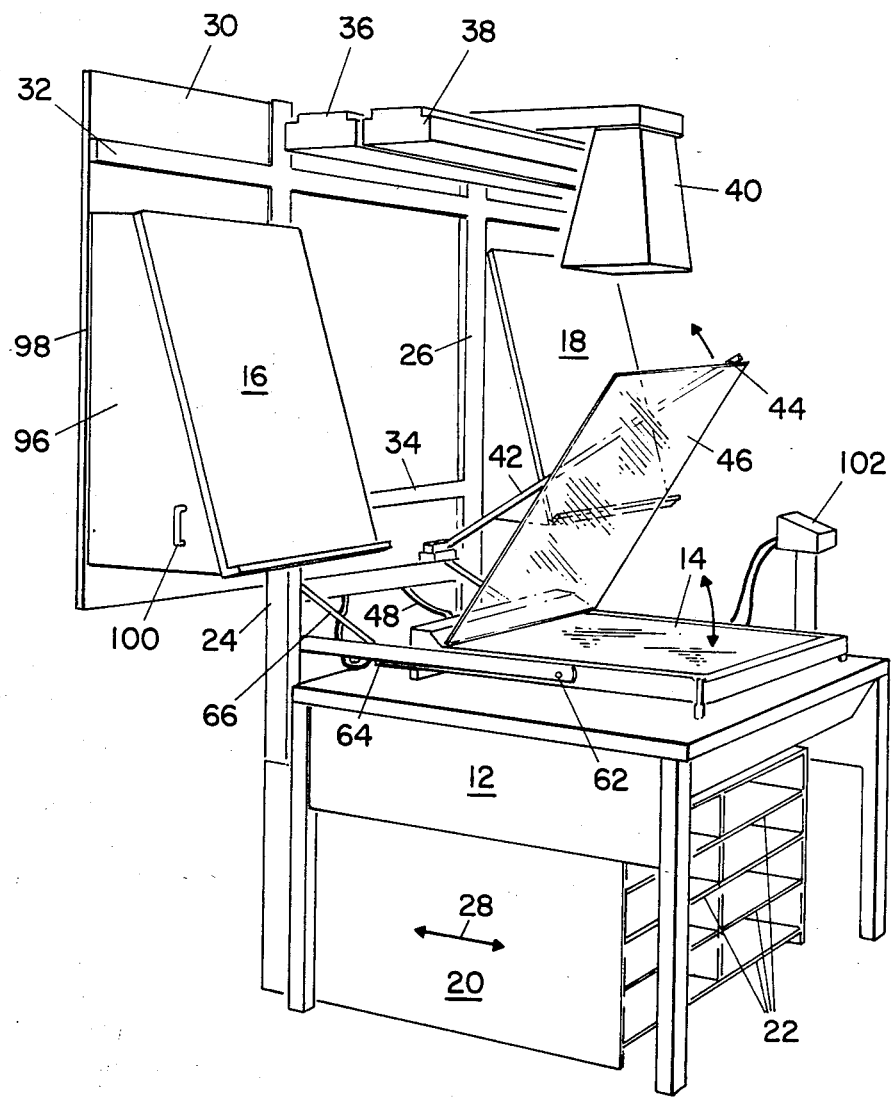
FIG. 1 is a perspective view of a combined stripping and contact frame work station illustrating the principles of the present invention.

Referring more particularly to the drawings, FIG. 1 is a perspective view of a combined light table 12, and additional equipment for removably supporting a vacuum contact frame 14 at the same work station area where the light table is located. The light table is a conventional light table used for "stripping" work, or the assembling of film negative clips to form a composite image. The table 12 may, for example, be light table Model No. LT-D, made by Millington and Sons Company, of Torrance, Calif., having an internal light source and arrangements for diffusing the light at the surface of the table. The vacuum contact frame 14 is mounted for movement between two positions, one where it is ready for use as a normal vacuum contact frame, with this position being shown in FIG. 1, and a second position where it is tilted upwardly and to the rear so that it fits between the two portions 16 and 18 of an easel, with its back surface forming a part of the easel as shown, for example, in FIG. 7 of the drawings. The assembly for supporting the easel and the vacuum contact frame includes the heavy base 20, provided with storage shelves 22 for storing film and other supplies needed by the stripper, and two vertically extending steel tubular frame members 24 and 26 which are solidly secured to the base 20. The arrow 28 indicates how the base 20 may be slid in directly under the light table 12, so that the entire work station assembly takes up only a few more inches of floor space, than the light table alone would normally occupy. Secured to the vertical supports 24 and 26 is a rear panel 30 which serves to separate adjacent work stations, and also to provide increased strength and rigidity for the assembly. The laterally extending bracing members 32 and 34 also provide for increased strength. Mounted up on top of the assembly are various lights, including a "safe" light 36, a fixture 38 for conventional indoor illumination, which may be a conventional fluorescent light fixture, and a high intensity lamp 40 of 1,000 watts or so, intended for use in exposing the "lights-on" film which may be employed in the contact frame 14.

The pivoted control arm 42 has a plunger actuated hooking element 44 at its outer end which selectively lifts the glass plate 46 from the surface of the vacuum contact frame 14, as the frame 14 is lowered into its working position, if the vacuum pump is not working to apply a vacuum to the frame 14. Thus, the control lever 42 is hollow and is connected to the vacuum pump by a flexible tube 48, which retracts the plunger 44 so that it will not grip the edge of glass plate 46 if the vacuum is "on". Thus, in some cases, after the vacuum has been applied, the stripper may wish to raise the vacuum contact frame with the film and clips in it, so that it forms part of the easel, and do other work on the work table 12. Under these conditions, as the vacuum frame is returned to the work position, it is not desired to lift the glass plate 46 off of the vacuum frame, and accordingly, with the plunger 44 retracted into the hollow shaft 42, this does not occur. As better shown in FIG. 2 of the drawings, the outer plunger 44 is spring biased to the extended position by the spring 52, with the displacement and angular positioning of the plunger being controlled by a pin from plunger 44 extending through a slot in the control rod.

FIG. 2 is also useful in showing the mode of operation of the position shifting mechanisms for the vacuum frame 14. More specifically, the mechanism includes the lever having three sections 54, 56 and 58 which are rigidly connected together and which are fixedly pivoted to the frame member 24 at the fixed pivot point 60. The contact frame 14 has two pivot points 62 and 64. The pivot point 62 is pivotally connected to the member 54, and the pivot point 64 is connected to the linkage 66 having a second pivot point 68 where it is secured onto the vertical support member 24. Pivot point 64 is secured to the end of side frame support member 65 which extends along one side of contact frame 14, as shown to advantage in FIG. 5 of the drawings.

It may be noted in passing, that the contact frame has a lower surface 72 which becomes part of the easel facing the work station, and the lip 74 serves to retain papers into the easel surface 72 when the contact frame 14 is in its upper position. The surface 72 and the lip 74 are shown in dashed lines at reference numerals 72-1 and 74-1 in FIG. 2.

The left and right-hand sides of the vacuum contact frame 14 are provided with similar linkages, and their movement is coordinated by the interconnecting square steel tube 76 which is pivoted about point 60, is rigidly connected to part 56 and extends across the rear of the unit. Two large coil springs 78 and 80 are provided to counterbalance the weight of the vacuum frame 14 in much the same manner as the springs on garage doors accomplish a similar function. The spring 78 is secured to point 80 forming part of the pivotally mounted linkage member 54, 56 and 58, and a similar point of connection is provided at the left-hand side of the work station for the spring 80. Incidentally, FIG. 3 is a showing from the rear of the unit, but with the easel and the base, as well as the sheet 30 not shown in this figure.

Figure 6:
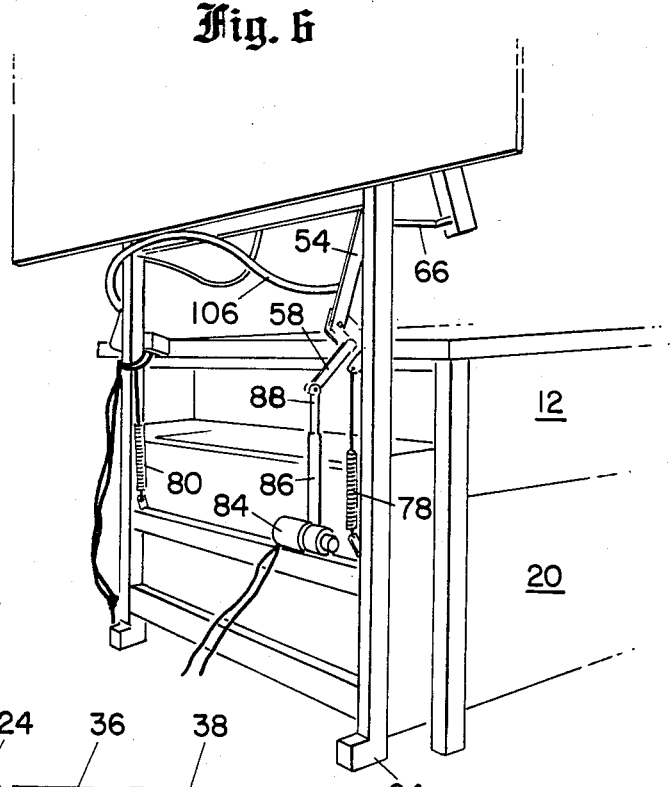
FIG. 6 is a rear view of the mechanism by which the vacuum frame is raised, showing the vacuum frame in its raised position.
Figure 7:
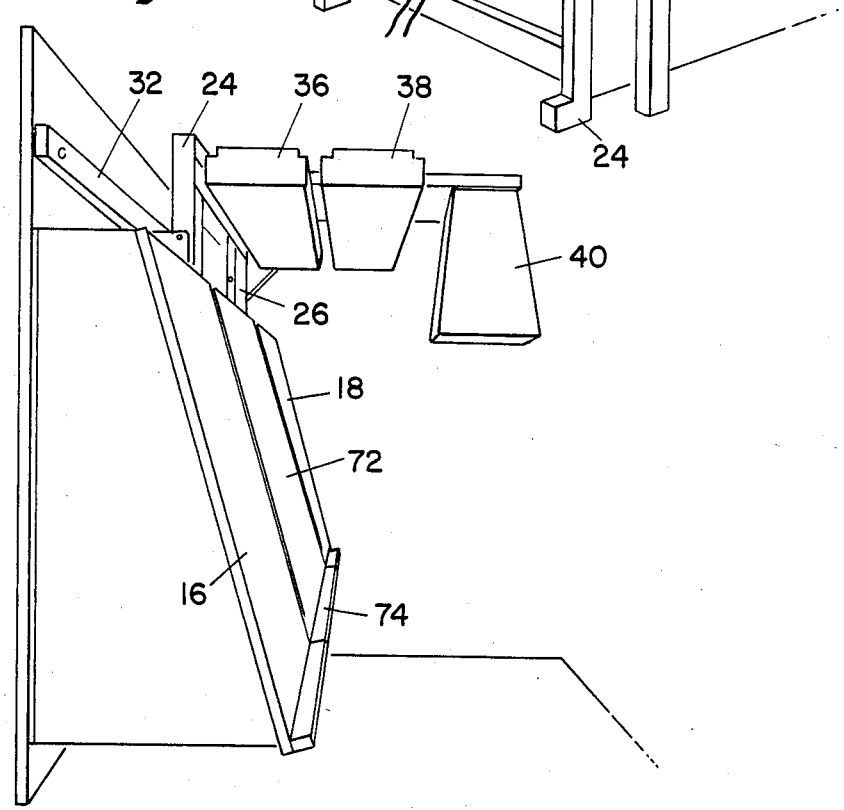
FIG. 7 shows the complete easel, with its central section formed from the rear side of the vacuum contact frame, and the various lights associated with the equipment.

Now, when it is desired to move the vacuum frame 14 from its work position on top of the work table, to its easel position, the motor 84 is energized. The motor 84, the cylindrical housing 86, and the protruding actuating rod 88 are purchased as a single unit from Motion Systems, Inc., 614 Rodan Place, Shrewsbury, N.J. 07707, under Model No. 85151. The shaft 88 has a 6-inch travel, when the motor is energized. In FIG. 2 of the drawings, the contact frame 14 is in its lower position, and the actuating shaft 88, secured to pivot point 92 in the linkage 58, is in its fully extended position. When the motor 84 is actuated, the rod 88 is slowly pulled down, and it is understood that this is through a screw actuation within the housing 86 and by gear reduction mechanism included therein. FIG. 6 shows the drive shaft 88 in its retracted position, with the linkage 58 pulled down, so that the arm 54 extends upwardly, the guiding arm 66 being raised to a substantially horizontal position, and the vacuum frame itself, which is not shown in this view of FIG. 6, being entirely in its raised position to form part of the easel, all as shown in FIG. 7 of the drawings.

Figure 4:
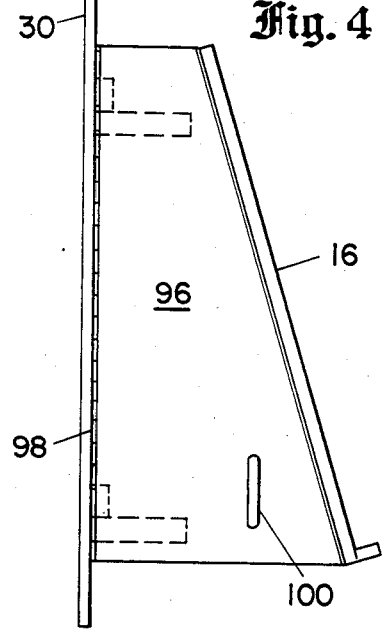
FIG. 4 is a side view of the easel portion of the system.

Returning to FIGS. 1 and 4 of the drawings, the easel unit 16 may serve as a storage cabinet for materials used by the stripper, and may be provided with an access door 96 with a hinge 98 and a handle 100. The easel unit 18 may be similarly provided with access on either side thereof. A light integrator unit 102 may be provided for controlling the duration of the exposure provided by the high intensity light 40. Through the use of the light integrator, variations in light intensity caused by line voltage fluctuations, or degradation of the light bulb within the unit 40, will not affect the exposure.

Incidentally, for completeness, it is noted that the vacuum contact frame 14 may also be purchased from Millington and Sons Company of Torrance, Calif. and it is identified as a 30"×36" Millington Ribbed Blanket-type vacuum contact frame. The light 40 is a high intensity 1,000 watt, 120 volt quartz light and may be purchased under Part No. AL 1KT, from the Olec Corporation, of 927 Newhall Street, Costa Mesa, CA. 92627. A vacuum pump may be housed within the base 20, or may merely sit on the floor beside the work station. A suitable vacuum pump may be purchased from Bremer-Fiedler & Associates, 13824 Bentley Place, Cerritos, CA 90701. The light integrator 102 may be Part No. AI-11X, identified as an Olex Digital Integrator, made by the Olec Corporation, of the address indicated hereinabove.

Incidentally, we have noted the vacuum connection 48 to the control rod 42; and it may also be noted that the vacuum hose 106 couples the contact frame 14 to the vacuum pump, mentioned above.

Figure 5:
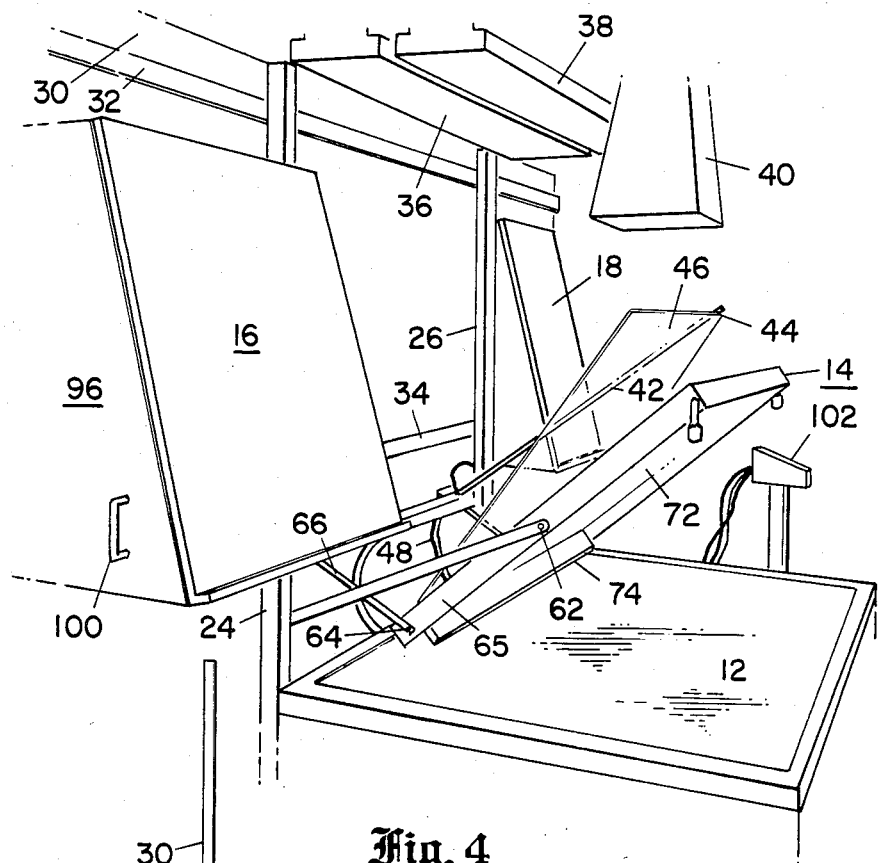
FIG. 5 is a more detailed view of the upper portion of the apparatus showing the contact frame being lowered into position, without vacuum pressure being applied thereto, and accordingly, with the glass plate being raised off the upper surface of the contact frame.

FIG. 5 shows the vacuum contact frame 14 in an intermediate position in the process of being lowered with the vacuum off. With the vacuum off, the hooked end 44 of the control rod 42 grips the glass plate 46 and pulls it away from the remainder of the contact frame 14 leaving the upper surface of the contact frame open for work when it is lowered onto the work table 12.

In conclusion, it is to be understood that the foregoing description and the drawings are illustrative of the preferred embodiment of the invention. However, other changes and modifications may be accomplished within the scope of the present invention. Thus, by way of example and not of limitation, instead of folding directly away from the work station to the rear, the vacuum contact frame 14 could be shifted to a position raised to one side, or could be directly pivoted to the rear, instead of forming part of the easel, as in the embodiment shown and disclosed in detail hereinabove. In addition, the work table 12 may be a more conventional plain work table rather than an optical light table, for some applications. It is also noted that, if desired, automatic switching arrangements may be provided for turning off the normal indoor illumination 38 and turning on the "safe" photographic light 36 when the contact frame 14 is lowered. Further, the frame 14 for forming composite images need not be provided with a vacuum, although the use of a vacuum contact frame is preferred. Accordingly, in view of the foregoing alternatives, it is to be understood that the present invention is not limited to the specific arrangements described in detail in previous portions of this specification and shown in detail in the drawings.

What is claimed is:

1. A combined stripping and contact frame work station assembly comprising:
   a work table;
   an easel;
   means for mounting said easel for convenient access and viewing by a person working at said work table;
   a vacuum contact frame having a working side provided with a pivotal transparent plate and an easel side having a lip for retaining papers, and
   means for mounting said vacuum frame for movement between a first working location with the vacuum frame flat on said work table and the transparent plate up, and a second location where the vacuum frame is clear of the table and the back thereof forms part of said easel.

2. A combined stripping and contact frame work station assembly as defined in claim 1, further comprising high intensity light means for applying intense illumination to film in said vacuum frame.

3. A combined stripping and contact frame work station assembly as defined in claim 1, further comprising a safe light and conventional illumination means mounted above said work table.

4. A combined stripping and contact frame work station assembly as defined in claim 1, further comprising means for pivotally separating said glass plate from the remainder of said vacuum contact frame as it is moved into position on the work table, if vacuum is not applied to said contact frame, but not if the vacuum is "on".

5. A combined stripping and contact frame work station assembly as defined in claim 1 wherein said work table is an optical light table including internal lighting and diffusely illuminated work surface.

6. A combined stripping and contact frame work station assembly as defined in claim 4 wherein said separating means includes a control rod having a piston with a hook thereon for engaging the outer edge of the glass plate on the contact frame, and means for retracting the piston and rendering the hook inoperative by the application of a vacuum when a vacuum is applied to the contact frame.

7. A combined stripping and contact frame work station assembly as defined in claim 1 including means for counterbalancing the weight of said contact frame.

8. A combined stripping and contact frame work station assembly as defined in claim 1 including first and second mechanical linkage means coupled to each side of said frame at different pivot points along the two sides of said frame, for shifting said frame including the lower edge thereof up away from the surface of said work table as it is raised to form part of said easel.

9. A combined stripping and contact frame work station assembly as defined in claim 1 including base means for storing stripping and film supplies, said base means extending under said work table, and said work station assembly including means secured to said base for supporting said lights and said illumination means as well as said easel.

10. A combined stripping and contact frame work station assembly comprising:
a work table;
a vacuum contact frame having a working side provided with a pivotal transparent plate; and
mechanical means for mounting said vacuum frame for movement between a first working location with the vacuum frame flat on said work table with the transparent plate up, and a second location where the vacuum frame is stored in a location clear of the surface of said work table;
whereby a single work station may be used for both stripping and contact frame printing.

11. A combined stripping and contact frame work station assembly as defined in claim 10, further comprising means for pivotally separating said glass plate from the remainder of said vacuum contact frame as it is moved into position on the work table, if vacuum is not applied to said contact frame, but not if the vacuum is "on".

12. A combined stripping and contact frame work station assembly as defined in claim 10 wherein said work table is an optical light table including internal lighting and a diffusely illuminated work surface.

13. A combined stripping and contact frame work station assembly as defined in claim 11 wherein said separating means includes a control rod having a piston with a hook thereon for engaging the outer edge of the glass plate on the contact frame, and means for retracting the piston and rendering the hook inoperative by the application of a vacuum when a vacuum is applied to the contact frame.

14. A combined stripping and contact frame work station assembly as defined in claim 10 including means for counterbalancing the weight of said contact frame.

15. A combined stripping and contact frame work station assembly as defined in claim 10 including first and second mechanical linkage means coupled to each side of said frame at different pivot points along the two sides of said frame, for shifting said frame including the lower edge thereof up away from the surface of said work table as it is raised to form part of said easel.

16. A combined stripping and composite image frame work station assembly comprising:
a work table;
an easel;
means for mounting said easel for convenient access and viewing by a person working at said work table;
a composite image formation frame having a working side provided with a glass plate and an easel side; and
means for mounting said frame for movement between a first working location with the frame flat on said work table, and a second location where the frame is clear of the table and the back thereof forms part of said easel.

17. A combined stripping and contact frame work station assembly as defined in claim 16, further comprising high intensity light means for applying intense illumination to film in said frame.

18. A combined stripping and composite image frame work station assembly as defined in claim 16 further comprising a safe light and conventional illumination means mounted above said work table.

19. A combined stripping and contact frame work station assembly as defined in claim 16 including means for counterbalancing the weight of said frame.

20. A combined stripping and contact frame work station assembly as defined in claim 16 including first and second mechanical linkage means coupled to each side of said frame at different pivot points along the two saides of said frame, for shifting said frame including the lower edge thereof up away from the surface of said work table as it is raised to form part of said easel.

* * * * *